MOTOR PUMP

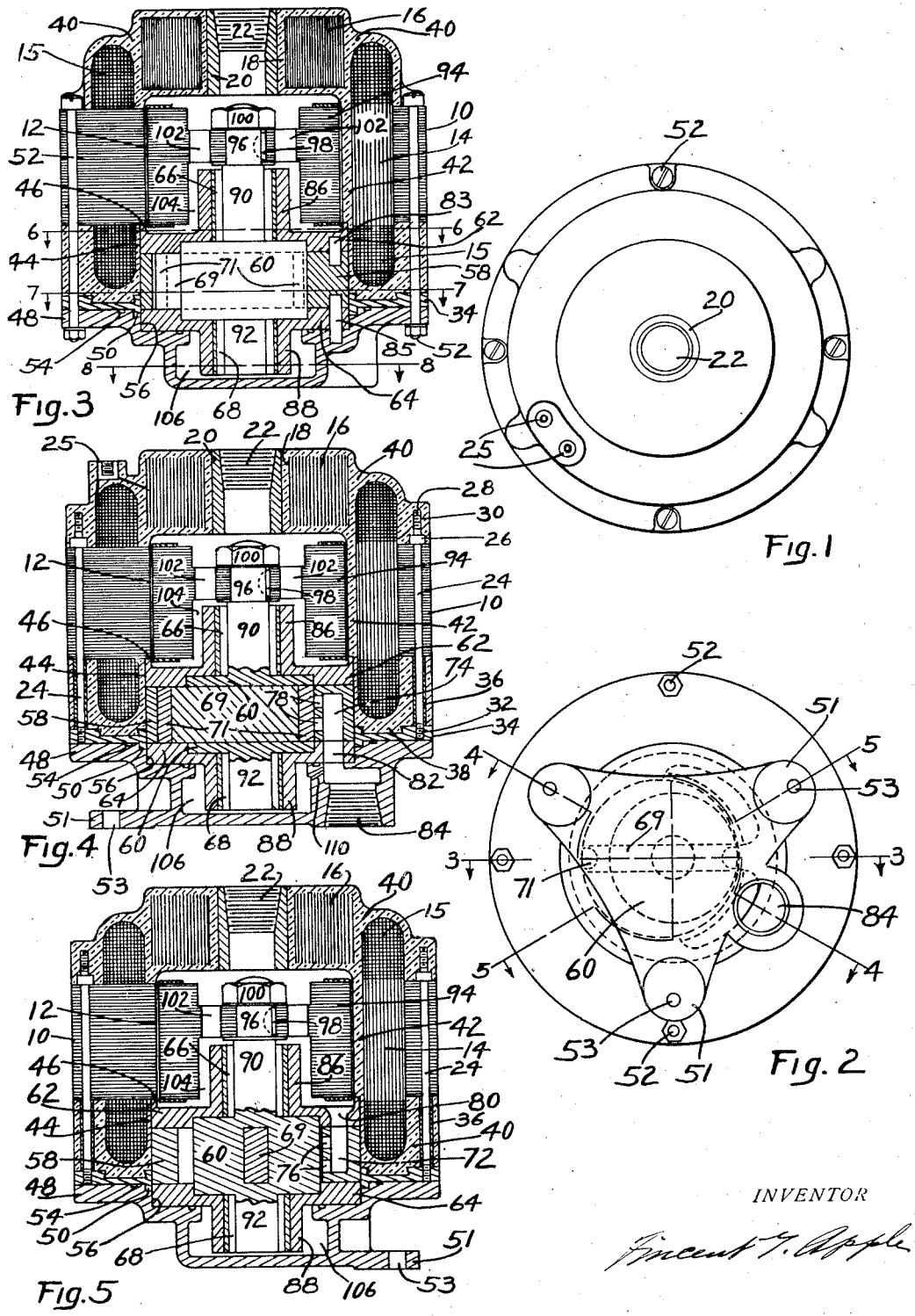
May 23, 1933. V. G. APPLE 1,911,128
MOTOR PUMP
Filed Jan. 16, 1931 2 Sheets-Sheet 1
INVENTOR May 23, 1933.　　　V. G. APPLE　　　1,911,128

Filed Jan. 16, 1931　　2 Sheets-Sheet 2

INVENTOR

Vincent G. Apple

Patented May 23, 1933

1,911,128

UNITED STATES PATENT OFFICE

VINCENT G. APPLE, OF DAYTON, OHIO; HERBERT F. APPLE, EDWARD M. APPLE, AND GOURLEY DARROCH EXECUTORS OF SAID VINCENT G. APPLE, DECEASED

MOTOR PUMP

Application filed January 16, 1931. Serial No. 509,113.

This invention relates to power driven pumps and more particularly to pumps wherein the operative pumping means is directly connected to a prime mover, preferably an electric motor.

An object of the invention is to so combine an electric motor and a pump as to utilize otherwise unused space within the motor to contain the pump.

Another object is to so provide a structure wherein one and the same pair of journals and bearings may serve both as motor bearings and pump bearings, to the end that my improved device will require one less pair of journals and bearings than are customarily required in motor driven pumps.

Another object is to so provide a motor driven pump in which a pressure or vacuum tight enclosure entirely surrounds the operative elements of both the motor and the pump, to the end that no stuffing box is needed as is the case in conventional pumps where the operative element of the pump extends from the pump housing to be driven by exterior means.

Another object is to move the fluid being pumped through the motor housing, to the end that the interior of the motor, though tightly closed will remain at a low temperature.

Another object is to provide, for the electric motor of any motor pump, a stator body composed entirely of non-hygroscopic insulation of a kind resistant to the fluid being pump within the walls of which the stator windings and a condenser are enclosed and hermetically sealed, to the end that contact of the fluid being pumped, with the stator walls, will have no deleterious effect on the motor windings or the condenser.

I attain these objects in the illustrative embodiment of my invention hereinafter disclosed, the description being facilitated by reference to the accompanying drawings wherein, Fig. 1 is a top plan view of my improved motor pump.

Fig. 2 is a bottom plan view of my improved motor pump.

Fig. 3 is an axial section taken at 3—3 of Fig. 2.

Fig. 4 is an axial section taken at 4—4 of Fig. 2.

Fig. 5 is an axial section taken at 5—5 of Fig. 2.

Similar numerals refer to similar parts throughout the several views.

Figure 6:
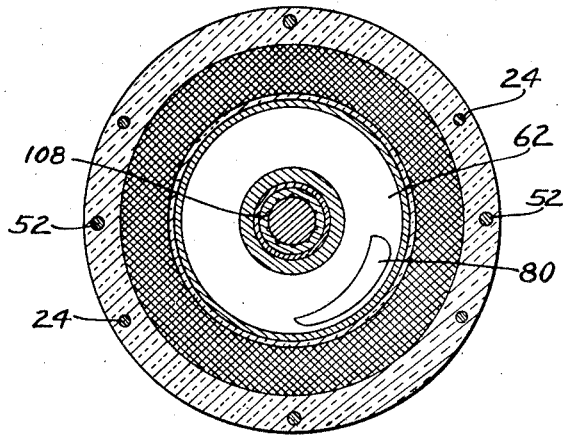
Fig. 6 is a transverse section taken at 6—6 of Fig. 3.

In the illustrative embodiment of the invention shown, the motor is of the alternating current type having a stator with a two phase winding adapted to single phase current by the inclusion of a condenser in one of the circuits. The pump is of the rotary type wherein a cylindrical rotor revolves within a cylindrical casing with the axes of the rotor and cylinder parallel but eccentric to each other with a single blade slidable in a slot in the rotor crosswire of the axis, dividing the cylinder into two compartments in any position of the rotor. The cross section of the cylinder in this type of pump is preferably not a true circle but a slightly oval shape called the Utley curve.

In the stator a laminated core 10 having a central opening 12 for a rotor carries the winding, the coil sides 14 being disposed in slots in the core surrounding the rotor opening and the coil heads 15 extending beyond the ends of the core. The phase changing condenser 16 occupies unused space within one of the coil heads. The condenser is of the rolled strip type with a relatively large opening 18 in the center. A metal hub 20 is spaced apart from the condenser within this opening. Hub 20 is pipe tapped at 22 to receive a suction pipe through which the fluid may enter to pass through the motor on its way to the pump. In this way the condenser and the motor windings are both kept at a low temperature. Line terminals 25 are connected at proper points to the windings and to the condenser. Long studs 24 extend lengthwise through the core, the ends 26 being slightly enlarged to provide a shoulder. The ends are slotted at 28 and threaded at 30. The opposite ends of the studs are threaded at 32 into an end plate 34. Sleeves 36 keep the end plate 34 definitely spaced apart from the core 10. The end plate 34 has an annular dovetail groove at 38.

The several parts of the stator are held in their respective positions by a continuous body 40 of insulation molded in situ about the core 10, the coil sides 14, the coil heads 15, the condenser 16, the hub 20, the line terminals 25, the studs 24 and into the dovetail 38 of the end plate 34. The body 40 of insulation completely seals the winding and the condenser from communication with the interior of the stator. It will be observed that the body of insulation 40 extends into the inner ends of the winding slots as at 42 thus covering the coil sides where they lie in the core slots, so that the entire inner surface of the stator is composed of insulation except that the inner ends of the core teeth come through the insulation at the surface of the rotor opening 12.

There are a number of moldable plastic compounds which may be employed for the stator body 40, some of them resistant to one thing and some to another, so that the kind of insulation to be employed may be selected with reference to its capacity to resist the fluid to be pumped.

The portion 44 of the central opening immediately below the rotor opening 12 is somewhat larger than the rotor opening, so as to provide a shoulder 46. It is in this enlarged portion of the motor chamber that the pump is contained.

A base 48 fits over the annular rabbet 50 of end plate 34 and is drawn tightly to the end of the stator by bolts 52. A ring gasket 54 makes the joint pressure tight. Integral feet 51 having mounting bolt holes 53 extend radially at the lower end. Base 48 is counterbored at 56 to the same diameter as the portion 44 of the motor chamber. The lower end of the pump casing fits snugly into this counterbored portion.

The pump comprises the pump cylinder 58, the pump rotor 60, the upper bearing head 62, the lower bearing head 64, the bearing bushings 66 and 68, the rotor blade 69 and the blade end seals 71. In order to set the axis of the pump cylinder 58 eccentric to the axis common to the motor and the pump rotor 60, the cylinder 58 is necessarily thicker on one side than on the other. The eccentricity between the axes of the pump rotor and pump cylinder is such that the pump rotor makes a line contact as at 70 (see Fig. 7), with the pump cylinder at its thickest part.

Figure 7:
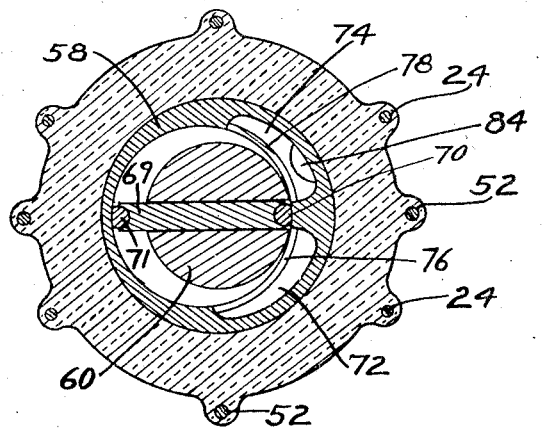
Fig. 7 is a transverse section taken at 7—7 of Fig. 3.

Within the wall of cylinder 58 adjacent the line of contact 70, there are two arcuate passages, a suction passage 72 (see Figs. 5 and 7) and a discharge passage 74 (see Figs. 4 and 7). Circumferentially extending slots 76 and 78 function as suction ports and discharge ports to connect the interior of the cylinder to the suction passage 72 and discharge passage 74 respectively. It will be noticed that suction passage 72 extends from the upper edge within the cylinder wall downwardly but not through the wall to the lower end, while discharge passage 74 extends from the lower edge within the cylinder wall upwardly but not through the wall to the upper end.

Bearing head 62 has an arcuate slot 80 (see Figs. 5 and 7), which corresponds to suction passage 72, while bearing head 64 has an arcuate slot 82 (see Fig. 4) which corresponds to discharge passage 74. In this way the interior of the motor is connected to the interior of the pump cylinder through the slot 80, the suction passage 72 and the suction ports 76, while the discharge ports 78, discharge passage 74 and slot 82 connect the interior of the pump cylinder to the tapped discharge opening 84 in the motor base 48. Dowel pins 83 and 85 prevent relative rotative movement between the pump cylinder 58 and the bearing heads 62 and 64. The axial dimensions of the cylinder 58 and the heads 62 and 64 is such that these three parts are clamped together tightly against the shoulder 46 when the base 48 is drawn tightly against the end plate 34 by the bolts 52.

Figure 8:
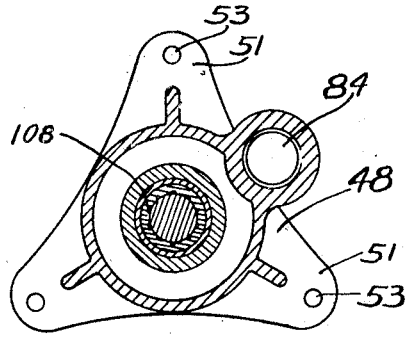
Fig. 8 is a transverse section taken at 8—8 of Fig. 3.

Bearing heads 62 and 64 have upwardly and downwardly extending bearing hubs 86 and 88 which carry the bearing bushings 66 and 68 respectively. The pump rotor 60 has integral journals 90 and 92 rotatably supported in these bearing bushings. The motor rotor 94 is secured to an extension 96 of the upper journal 90 by the key 98 and the nut 100. A series of holes 102 permit free passage of the fluid being pumped from the inlet 22 through the rotor to the slot 80. The hub 86 extends into a clearance space 104 in the motor rotor while the hub 88 extends into a clearance space 106 in the base 48. The bearing bushings are internally fluted as at 108 (see Figs. 6 and 8) to permit free passage of the fluid being pumped to and around the journals, the device being thus adapted to pump fluids which are in themselves lubricants or with which a lubricant has been mixed. Where water is to be pumped the bearing bushings 66 and 68 may be of the soft rubber type now commonly used for under water bearings, or where oil is to be pumped an ordinary bronze bushing may be employed. A small opening 110 (see Fig. 4) connects the discharge opening 84 with the clearance space 106 in the base, whereby the pressure is equalized and no leakage will occur from the interior of the pump casing through bearing bushing 92.

From a consideration of the foregoing description and drawings it will be seen that the motor pump herein shown and described differs from those of the conventional design in that space is conserved by using vacant space within the motor for the pump; that there is only one pair of bearings for both motor and pump; that no stuffing box is required to prevent leakage of the fluid being pumped; that although the motor is tightly enclosed it will remain cool because the fluid being pumped passes through the motor; and that neither the motor windings nor the condenser may be injured by the passing of the fluid through the motor.

Having thus described an embodiment of my invention, I claim,

1. The combination, in a motor pump, of a hollow stator core, a stator winding on said core having winding heads extending beyond the ends of the core, an electric rotor having axial openings therethrough within said hollow stator core, an electric condenser concentrically located within one of said winding heads said condenser having a central opening therethrough, a rotary pump concentrically located within the other winding head the rotatable member of said pump extending from said pump and making driving connection with said electric rotor, a stator body comprising a single mass of hardened impervious insulation penetrating, surrounding and completely covering said winding and said condenser and forming a support for said pump, said body having an inlet opening within the central opening of said condenser, the course of the fluid being pumped being in at the said inlet opening through the condenser, through the axial openings in the electric rotor to the said pump.

2. The combination, in a motor pump, of a hollow stator core, a stator winding on said core having winding heads extending beyond the ends of the core, a stator body comprising a single mass of hardened impervious insulation penetrating, surrounding and completely covering said winding, said mass having a central opening, a portion of said opening being surrounded by said core and the remainder by one of said extending winding heads, a rotary pump concentrically supported in said central opening within said extending winding head, said pump having a cylinder with its bore eccentric to the remainder of the pump leaving one wall of said cylinder thicker than the other, there being a suction port connecting the interior of the pump cylinder to the interior of the motor and a discharge port connecting the interior of the pump to the outside contained in the said thicker part of said cylinder wall, a pump rotor extending from said pump into said central opening within said stator core, and an electric rotor secured to the extending end of said pump rotor, there being an inlet opening from the outside of the structure to the interior of the said central opening.

3. The combination, in a motor pump, of a hollow stator core, a squirrel cage rotor within said stator core of substantially the same axial length as said stator core having axial openings therethrough, a stator winding having annular winding heads extending axially beyond the ends of the stator core and the said squirrel cage rotor, an annular condenser connected to a portion of said winding filling the space within one of said winding heads, a rotary pump filling the space within the other of said winding heads, the operative member of said pump being connected to said squirrel cage rotor, and a pressure tight housing surrounding the said several parts and holding them positioned, said housing having a suction opening extending therethrough in the space within said annular condenser and a discharge opening in the opposite end, said pump having suction ports extending from said pump to the interior of said housing and discharge ports connecting said pump to said discharge opening.

In testimony whereof I affix my signature.

VINCENT G. APPLE.